US005550825A

United States Patent [19]
McMullan, Jr. et al.

[11] Patent Number: 5,550,825
[45] Date of Patent: Aug. 27, 1996

[54] HEADEND PROCESSING FOR A DIGITAL TRANSMISSION SYSTEM

[75] Inventors: Jay C. McMullan, Jr., Doraville; David B. Burleson; Donald R. Huntley, both of Roswell; Randolph J. Schaubs, Stone Mountain, all of Ga.

[73] Assignee: Scientific-Atlanta, Inc., Norcross, Ga.

[21] Appl. No.: 794,477

[22] Filed: Nov. 19, 1991

[51] Int. Cl.$^6$ .............................. H04J 1/00; H04N 7/14
[52] U.S. Cl. .................................................. 370/73; 348/7
[58] Field of Search .............................. 370/73, 124, 71, 370/76, 110.1, 112, 85.13; 358/86, 85; 455/6.1, 6.2, 6.3, 3.1, 4.1, 4.2; 348/7, 8, 723, 385, 387, 489

[56] References Cited

U.S. PATENT DOCUMENTS

| | | | |
|---|---|---|---|
| 3,885,089 | 5/1975 | Callais et al. | 455/3.1 |
| 4,109,281 | 8/1978 | Kanazashi et al. | 455/6.2 |
| 4,527,194 | 7/1985 | Sirazi | 358/86 |
| 4,654,843 | 3/1987 | Roza et al. | 370/73 |
| 4,787,085 | 11/1988 | Suto et al. | 455/6.1 |
| 4,835,604 | 5/1989 | Kondo et al. | 455/5.1 |
| 4,887,152 | 12/1990 | Matsuzaki et al. | 455/4.2 |
| 4,933,938 | 6/1990 | Sheehy | 370/85.13 |
| 4,937,821 | 6/1990 | Boulton | 370/73 |
| 4,949,170 | 8/1990 | Yanagidaira et al. | 358/86 |
| 4,975,771 | 12/1990 | Kassatly | 455/3.1 |
| 5,065,396 | 11/1991 | Castellano et al. | 370/112 |
| 5,091,937 | 2/1992 | Kawasaki | 358/86 |
| 5,142,690 | 8/1992 | McMullan et al. | 370/95.1 |

*Primary Examiner*—Douglas W. Olms
*Assistant Examiner*—Ajit Patel
*Attorney, Agent, or Firm*—Steven C. Stewart; Frederick W. Powers, III

[57] ABSTRACT

A headend method and apparatus for a digital transmission system is provided which includes inputs for receiving first and second program information from first and second program sources and inputs for receiving first and second control information from first and second control sources. The first and second program information is applied to a switching circuit and a switch control controls the switching circuit to output channels of program information comprising combinations of the first and second program information for output to a subscriber. Processing circuitry allows for selectively providing the first and second control information to the channels output from the switching circuit.

23 Claims, 6 Drawing Sheets

HEADEND PROCESSING FOR A DIGITAL TRANSMISSION SYSTEM

TECHNICAL FIELD

The present invention generally relates to a headend processor for a digital transmission system and, more particularly, to a headend processor for supplementing or replacing program information from a remote program source with program information from a source local to the headend processor. Additionally, the invention relates to a headend processor for selectively replacing control information from the remote program source with control information provided by a system operator at the location of the headend processor.

BACKGROUND OF THE INVENTION

The cable industry is currently introducing audio-only services. These cable "radio stations" may play a continuous succession of musical selections. Stations may be dedicated, for example, to different types of music such as rock, jazz, blues, easy listening, etc. Such service may be offered as a premium service in a cable system which also provides standard video services.

One technique for delivering high quality audio-only services is the use of digital audio. However, maintaining a large and diverse digital audio programming library is typically too expensive for most local system operators. Thus, such services may be provided by a vendor who provides digital audio programming to a number of system operators using, for example, a satellite system. The local system operator then need only provide equipment for combining the digital audio programming with the standard video services.

However, since the digital audio programming is provided by a vendor at locations remote from a system operator, the system operator has limited control of the audio services. For example, control of subscriber terminals is accomplished via subscriber terminal control transactions forwarded from the remote location. This reduces the ability of the local operator to effectively service customer problems since the local operator will frequently have to rely on the willingness of the vendor to quickly troubleshoot any problems which may arise. Delays in servicing individual subscribers results in dissatisfaction with the local system operator.

Additionally, a local operator using digital audio programming from a remote source is limited to providing programming from this remote source. Thus, events such as concerts by local symphonies and the like which may be of interest only to local subscribers are not offered.

SUMMARY OF THE INVENTION

Accordingly, it is an object of the present invention to provide a method and apparatus for generating and selectively substituting local subscriber terminal control transactions for subscriber terminal control transactions incorporated with programming originating at a remote program source.

It is another object of the present invention to provide a method and apparatus for adding local programming to programming originating at a remote program source.

It is another object of the present invention to provide a method and apparatus for selectively combining a plurality of programming and control inputs to output a desired arrangement of the programming and control inputs.

Thus, in accordance with the invention, a headend apparatus includes a first input for receiving first channels of program information from a first program source and a second input for receiving second channels of program information from a second program source. The first and second channels of program information are applied to a switching circuit and a switch control controls the switching circuit to output third channels of program information comprising combinations of program information of the first and second channels for distribution to a subscriber.

This arrangement provides flexibility to a system operator who is able to selectively configure the channels for distribution to subscribers in a desired manner using a plurality of program sources. Specifically, the present invention provides the capability of combining programming from a remote program source with programming from a local programming source. Thus, for example, a local system operator may provide programs of local interest such as concerts to subscribers.

Also in accordance with the present invention, a headend apparatus includes an input for receiving channels of program and first control information from a remote source and a detector for detecting the first control information. A local system control computer located at the headend apparatus generates second control information. Processing circuitry selectively replaces the first control information with the second control information.

This arrangement provides significant control capabilities to local system operators who now have the capability to control local systems with a view toward enhanced customer service and an improved ability to troubleshoot problems associated with particular subscribers or groups of subscribers. Additionally, local system operators are able to control subscriber terminals in a manner consistent with features and functions present in existing systems.

Also in accordance with the present invention, a headend apparatus includes inputs for receiving first and second program information from first and second program sources and inputs for receiving first and second control information from first and second control sources. The first and second program information is applied to a switching circuit and a switch control controls the switching circuit to output channels of program information comprising combinations of the first and second program information for output to a subscriber. Processing circuitry allows for selectively providing the first and second control information to the channels output from the switching circuit.

This arrangement provides maximum flexibility to a system operator who can configure the output channels and effect subscriber terminal control at the local level.

BRIEF DESCRIPTION OF THE DRAWINGS

A more complete appreciation of the invention and many of the attendant advantages thereof will be readily obtained as the invention becomes better understood by reference to the following detailed description when considered in connection with the accompanying drawings.

DETAILED DESCRIPTION OF THE PREFERRED EMBODIMENT

Figure 1A:
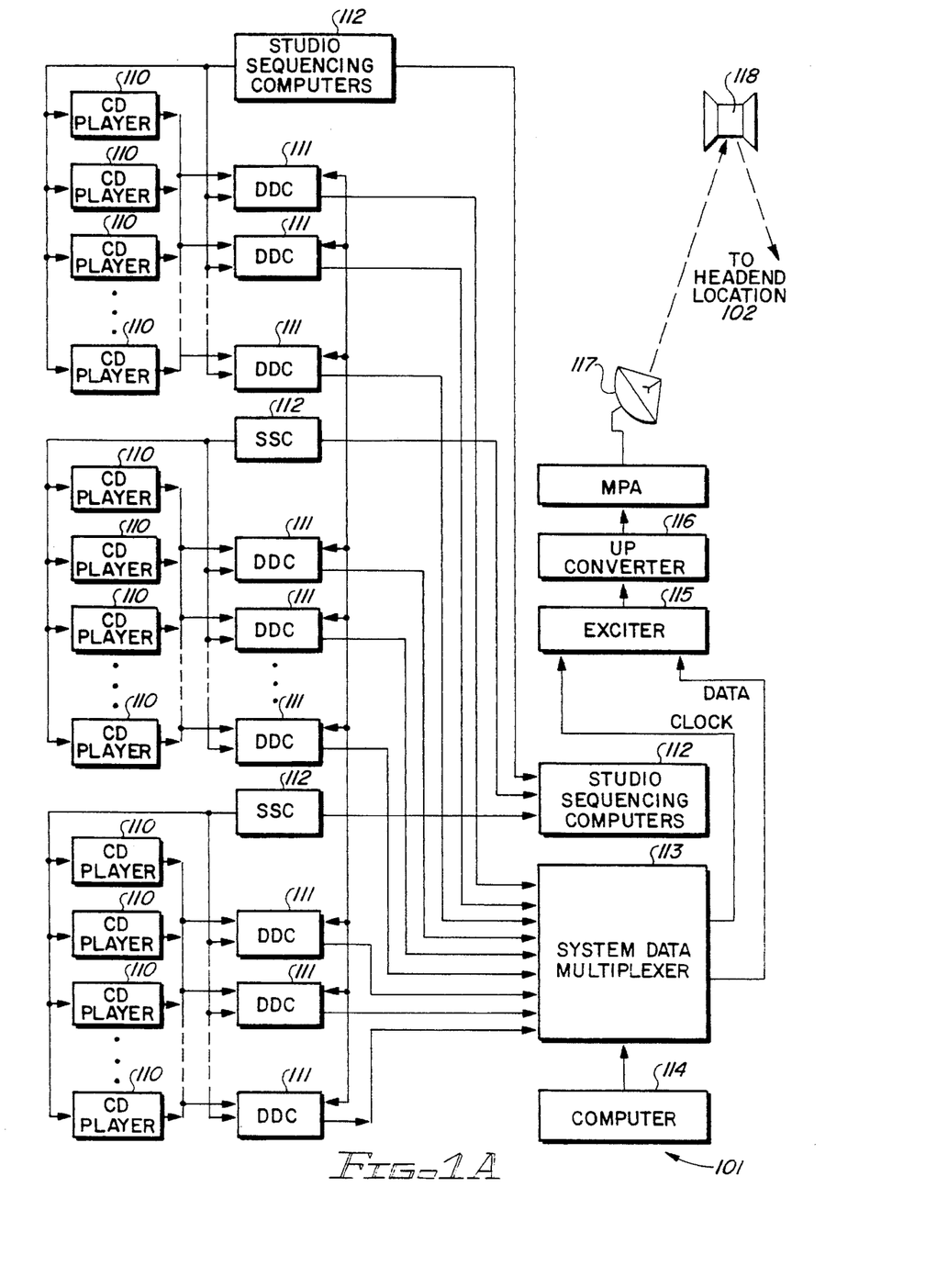
FIGS. 1A and 1B are block diagrams of a digital transmission system in which the headend processor of the present invention may be utilized.
Figure 1B:
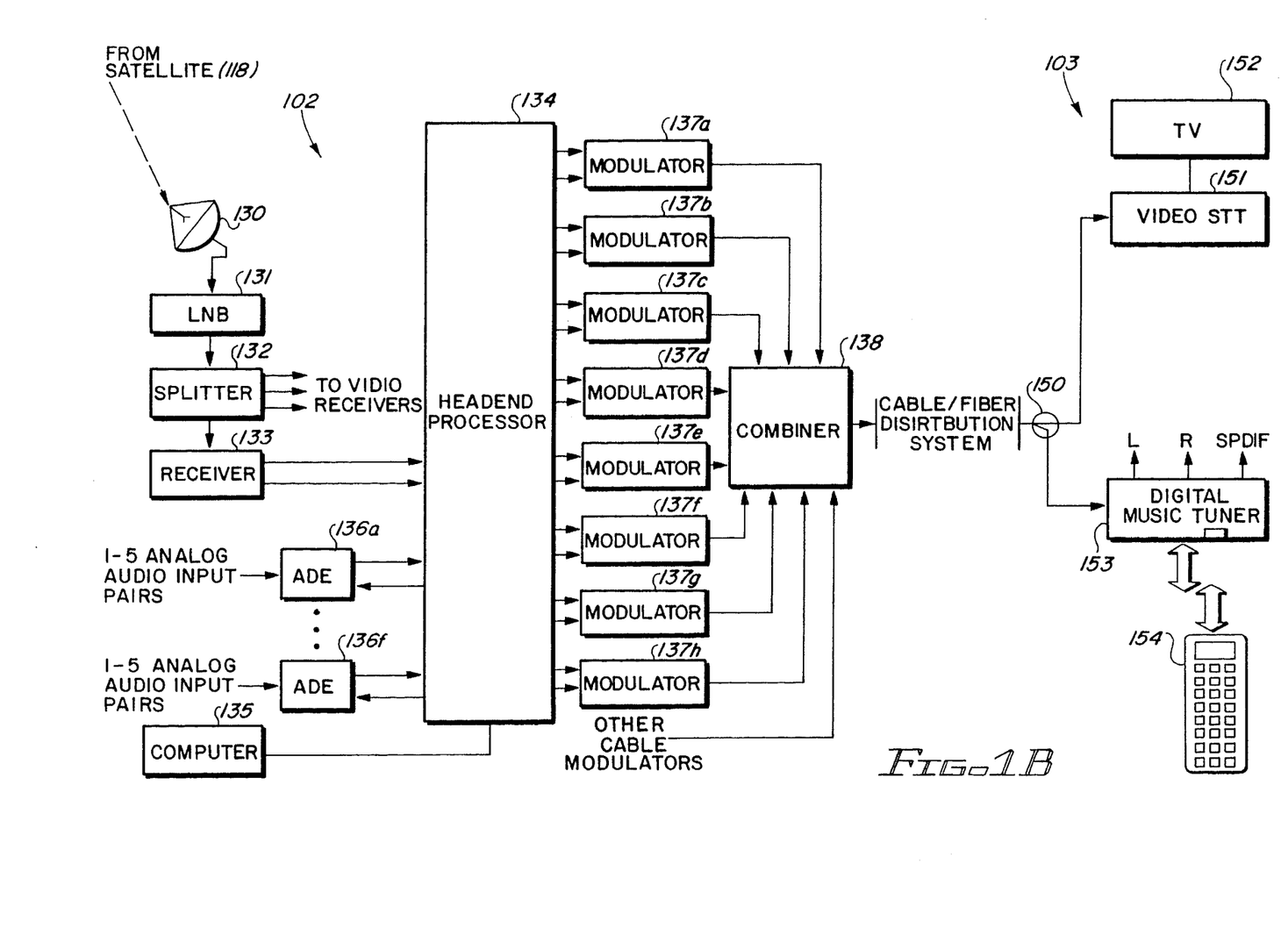

FIGS. 1A and 1B illustrate a digital communication system for transmitting digital information to one or more subscriber terminals in which the headend processor of the present invention may be utilized. Specifically, FIGS. 1A and 1B illustrate a digital audio communication system, although the present invention is not limited in this respect. The teachings of the present invention may also be applied to communication systems for transmitting video, text, and other data. Digital communication system 100 includes an uplink location 101, a headend location 102, and one or more subscriber locations 103.

Uplink location 101 is a master source of digital audio program and control information which is transmitted to one or more headend locations 102. Other information such as video, text, and other data may also be transmitted along with the digital audio programming and control information. Reference may be made to commonly assigned application Ser. No. 07/618,744 for a more detailed description of the operation of the headend location, said application incorporated herein by reference. A plurality of digital audio program sources 110 such as compact disk (CD) players are arranged at uplink location 101. A typical uplink location may include, for example, thirty compact disk players. The uplink location may alternatively include thirty pairs of compact disk players in order to proceed without pause from one compact disk or musical number to another without pause. The disk in a first player of a pair may be changed while the disk in a second player of the pair is played. The digital data streams from digital audio program sources 110 are supplied to respective digital to digital (D/D) converters or encoders 111 under the control of sequencing computers 112.

D/D converters 111 perform a number of operations involving the data stream supplied thereto. A time base correction corrects for time base errors caused by differences in the respective clocks of the individual digital audio program sources. D/D converters 111 compress the digital audio program information and insert error correcting codes in the data stream. The compression may be carried out using a process described in U.S. Pat. No. 4,922,537, which patent is incorporated herein by reference. Various error correction codes such as Bose-Chaudhuri-Hocquenghem (BCH) and Hamming codes may be utilized.

Figure 2:
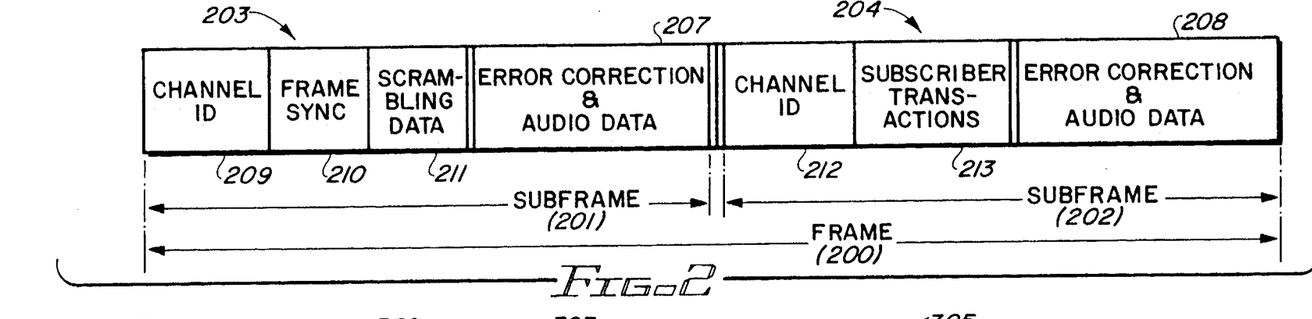
FIG. 2 is schematic diagram of a frame format which may be utilized in the transmission system of FIG. 1.

D/D converters 111 format the data stream in a frame format such as that schematically illustrated in FIG. 2. Each frame consists of a predetermined number of bits N. Various frame formats may be utilized and the format shown in FIG. 2 should be viewed as merely illustrative of one such format. Frame 200 of FIG. 2 includes a first subframe 201 and a second subframe 202. Subframes 201 and 202 each contain the same number of bits, i.e., one half N/2 of the number of bits in frame 200. Subframes 201 and 202 include respective frame headers 203 and 204 and respective error correction and digital audio program data portions 207 and 208. Frame header 203 includes channel identification data 209, frame synchronization data 210, and scrambling data 211 for scrambling and descrambling. Scrambling as used herein refers to methods of altering or encrypting the identity of a video or audio signal in order to prevent its reception by persons not having authorized subscriber terminals. If the data stream or portions thereof are encrypted, the scrambling data 211 may include a key for decrypting the data. Various scrambling methods may be utilized and the present invention is not limited in this respect. Frame header 204 includes includes channel identification data 212 and subscriber terminal control transactions 213. D/D converters 111 appropriately place the digital audio program data and the error correction data within the appropriate portions of the frame, but do not provide any valid data in the headers. As discussed below, the outputs of several D/D converters are multiplexed. Accordingly, the digital audio program data portions of frame 200 are configured to accommodate for this multiplexing. The output of each D/D converter 111 is a data stream of 1.12896 megabits per second.

System data multiplexer 113 provides overall system timing and includes a master clock which controls the output of the data streams from D/D converters 111. Multiplexer 113 time division multiplexes or interleaves the data streams of a predetermined number of D/D converters 111 (such as five) within the error correction and digital audio program data portions of the frame. Thus, each channel identified by the channel data in the frame headers includes five stations of audio program data. Interleaving relates to the transmission of pulses from two or more digital sources in time-division sequence over a single path. The use of this technique in conjunction with error correcting codes can lower the error rates of communication channels that are characterized by error bursts. In the interleaving process, code symbols are reordered in such a manner that any two successive code symbols are separated by I-1 symbols in the transmitted sequence, where I is the degree of interleaving. Upon reception, the interleaved code symbols are deinterleaved or reordered into their original sequence using the same degree of interleaving. Interleaving spreads or randomizes the errors (in time) and enables an improvement in the error correcting capability of an error correcting code.

System data multiplexer 113 is coupled to a control computer 114 which provides the data for frame headers 203 and 204. The data includes: channel identification data indicating the channel associated with audio program data; frame synchronization data, which is a fixed bit pattern indicating the start of a frame; scrambling data used for scrambling and descrambling; and subscriber terminal control transactions for controlling a subscriber terminal at subscriber location 103. System data multiplexer 113 inserts the frame synchronization data, the channel identification data, and the subscriber terminal control transactions into the frame headers.

Each subscriber terminal has a unique identifier or address. This address permits control computer 114 to generate and forward subscriber terminal control transactions to an individual subscriber terminal. These transactions are known as "addressable" transactions. In some instances, a subscriber terminals control transaction may be forwarded to all subscriber terminals in the system. These are known as "global" transactions. Subscriber terminal control transactions include an address and a sequence of data bits (instructions) which instruct a microprocessor or a dedicated control logic of a subscriber terminal to carry our one or more actions. For example, a first subscriber terminal control transaction may control the authorization/deauthorization of a particular channel. A second subscriber terminal control transaction may control the enabling/disabling of subscriber terminal features such as remote control or digital output. Thus, subscriber transactions may control basic channel authorizations and other feature control.

Multiplexer 113 also optionally scrambles the data stream and inserts the scrambling data into the frame header. If desired, only a portion of the data stream may be scrambled. As noted, scrambling is an option and need not be performed. System data multiplexer 113 performs a further six to one (6:1) interleave and outputs a 33.8688 megabits per second data stream containing thirty audio stations and a 33.8688 megahertz clock signal. The data stream passes through satellite exciter 115 such as an offset quadrature phase shift keying (OQPSK) exciter and is up-converted by up-converter 116. The resultant signal is transmitted by antenna satellite 117 to satellite 118.

The satellite transmits a signal which is received at headend location 102 shown in FIG. 1B. Typically, the uplink location described above serves a number of headend locations (not shown) which are associated with one or more system operators.

The satellite signal including the thirty audio stations is received by antenna 130 and is amplified and block converted in low noise block converter (LNB) 131. The output of LNB converter 131 is an L-band signal at 950 to 1450 megahertz which is supplied to splitter 132. Splitter 132 provides the audio signal to receiver 133. Receiver 133 may, for example, be a Model 9430 data receiver available from Scientific Atlanta, Inc. As noted above, the uplink location may provide other signals such as video signals which are supplied by splitter 132 to other processing circuitry, e.g., video, text, data processing circuitry (not shown). Receiver 133 demodulates the signal applied thereto and recovers the 33.8688 megabits per second data stream. The data stream and a 33.8688 megahertz clock signal from receiver 133 is applied to headend digital processor (HDP) 134. A local system control computer 135 is coupled to headend processor 134 via a serial port and performs the overall control of the local system served by the headend location. As discussed in greater detail below, local system control computer 135 generates local subscriber terminal control transactions which may be used to control the subscriber terminals serviced by the headend location.

Headend processor 134 also receives input from up to six audio digital encoders (ADEs) 136a–136f. The audio digital encoders may be, for example, Model 9444 cd-X audio digital encoders available from Scientific Atlanta, Inc. The audio digital encoders provide digital audio program information generated from analog sources local to the headend. These local sources may include, but are not limited to, concerts, soundtracks to movies, simulcast of music events, and local radio stations. The invention is not limited to local analog program sources and local digital audio program sources may be utilized. Each audio digital encoder outputs a 5.6448 megabits per second data stream providing one channel of digital audio program information, each channel including up to five stations. Thus, the local audio program information input to headend processor 134 ranges from zero to as many as thirty audio stations.

Headend processor 134 is capable of processing the above-identified inputs in a number of ways. A first capability is to add locally generated audio program information from audio digital encoders 136a–136f to the digital audio program information from uplink location 101. Another capability is to replace subscriber terminal control transactions generated at uplink location 101 with subscriber terminal control transactions generated by local system control computer 135. Headend processor 134 is capable of receiving a plurality of programming and control inputs and combining these inputs in a desired manner. These capabilities, discussed in greater detail below, afford enhanced system control at a local level.

The channels output from headend processor 134 are respectively supplied to modulators 137a–137h. These modulators may be nine state quadrature partial response modulators capable of handling five stations and occupying a three megahertz bandwidth, such as Model 9450 modulators available from Scientific Atlanta, Inc. It will be apparent that phase shift key or other modulation methods may be utilized. Modulators 137a–137h respectively digitally filter the data, modulate, and convert the data to a selected output frequency for combining with other modulated carriers by RF combiner 138. The other modulated carriers may include video, text, and other data information. Each channel of five audio stations occupies three megahertz of bandwidth and can be carried in half of one six megahertz video channel.

The signal output by RF combiner 138 is distributed over a coaxial cable or fiber optic distribution system to a subscriber location 103. Reference may be made to commonly assigned copending application Ser. No. 07/618,744 for additional descriptions of the equipment at a subscriber location. The signal received at subscriber location 103 is supplied to directional coupler 150. The through signal is passed to video set top terminal 151 whose output is supplied to television 152. The coupled signal is supplied to a digital music terminal 153. Terminal 153 selectively tunes a three megahertz station containing digital audio program information corresponding to a station selected by the subscriber. The three megahertz station is demodulated to recover synchronization information and the 5.6448 megabit per second data stream. An application specific integrated circuit (ASIC) deinterleaves the five stations contained in the data stream of the selected channel. The header information is recovered and stored in registers. If the audio data is scrambled, descrambling is carried out using the scrambling data transmitted in the frame header. The audio data is then error corrected, decompressed, and formatted into two separate serial Outputs. The data is decompressed as described in U.S. Pat. No. 4,922,537. The first output is supplied to a D/A converter and is subsequently output as left and right analog speaker outputs. The second output is output in the Sony-Philips digital interface format (SPDIF) which is an industry wide format for the digital interchange of digital audio information between consumer audio equipment. Digital terminal 153 may be addressed by an IR remote control 154. Remote control 154 may alternatively utilize RF, ultrasonic, or other transmission methods known in the art. Information may also be provided to remote control 154 as described in application Ser. No. 07/618,744.

Subscriber terminal control transactions stored in the appropriate register may be processed either by the microprocessor or the application specific integrated circuit. If the control transaction is addressed to that subscriber terminal or is a global transaction, actions are performed in accordance with the instructions contained in the transaction. For example, one subscriber terminal control transaction may enable the use of R remote 154 with digital music terminal 153. Another subscriber terminal control transaction may enable the SPDIF output of digital music terminal 153. Yet another subscriber terminal control transaction may permit a subscriber to receive a pay-per-listen event.

Figure 3:
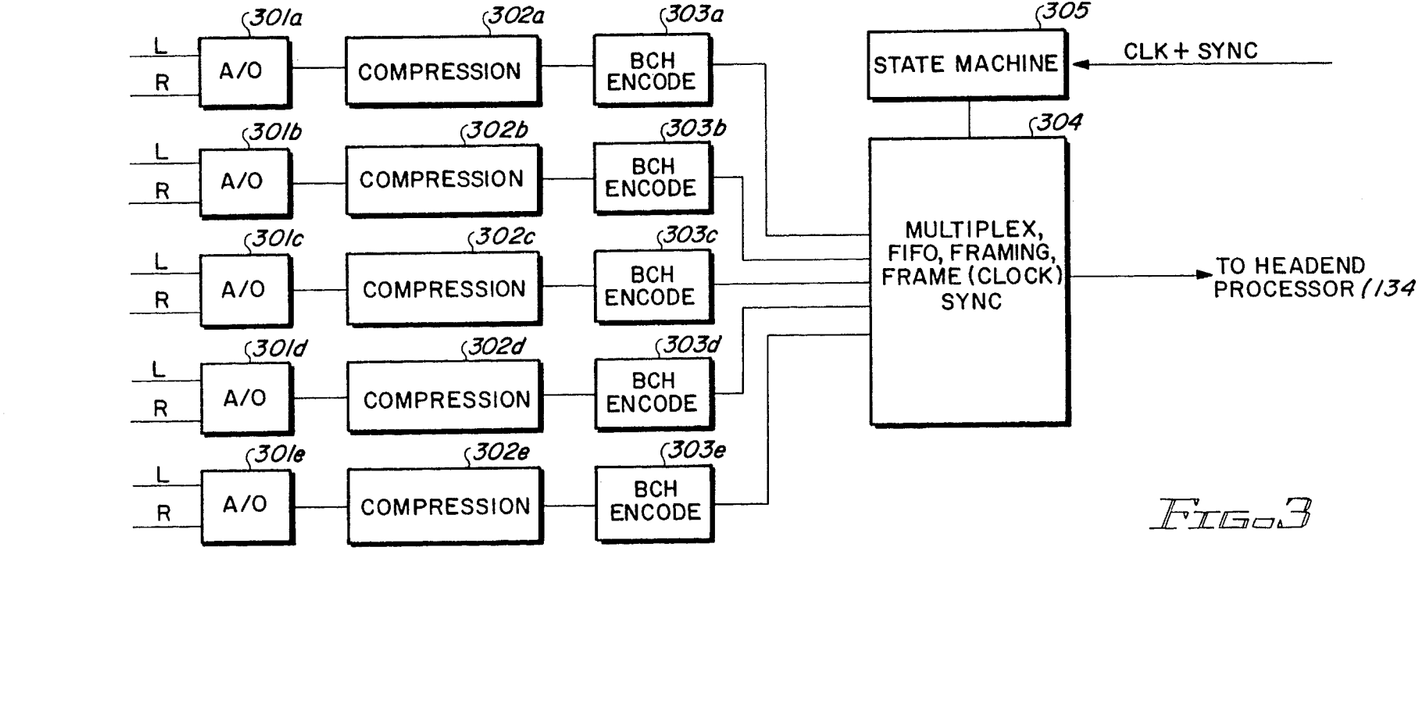
FIG. 3 is a block diagram of an audio digital encoder (ADE) illustrated in FIG. 1B.

FIG. 3 is a block diagram illustrating the detailed arrangement of audio digital encoder (ADE) 136a shown in FIG. 1B. Audio digital encoder 136a includes five A/D converters 301a–301e respectively receiving left (L) and right (R) analog inputs. The outputs of A/D converters 301a–301e are respectively provided to compression circuits 302a–302e. As at the uplink location, compression is carried out using the technique described in U.S. Pat. No. 4,922,537. The outputs of compression circuits 302a–302e are respectively provided to BCH encoders 303a–303e for adding error correction codes. The outputs of BCH encoders 303a–303e are supplied to multiplex circuit 304 for multiplexing, framing, and frame synchronization information under the control of a framing state machine 305. Framing state machine receives clock signal CLK via buffer 430 and synchronization information via transmit framing state machine 416. The frame format utilized by the audio digital encoders is the same format which is illustrated in FIG. 2. As noted above, the specific frame format is not critical to implementation of the invention. However, the frame format used at the uplink location and the frame format used by the audio digital encoders is preferably the same in order to minimize circuit complexity. The frame headers of the frames output by audio digital encoders 136a–136f do not include valid data and the output data stream is not scrambled. Multiplex circuit 304 outputs a 5.6448 megabits per second data stream including up to five stations of audio information. As shown in Figure 1B, six audio digital encoders may coupled to headend processor 134 to provide up to six channels of local audio program information. Since each channel may include up to five stations, a total of up to thirty local audio stations may be input.

The audio digital encoders can be driven either by a master clock derived from the satellite signal or by a local clock. Since the audio digital encoders may be driven by a local clock, the headend processor need not be coupled to a satellite receiver. That is, headend processor 134 may be utilized by a system operator to provide local audio information, even if digital audio program information from uplink location 101 is not present.

Figure 4A:
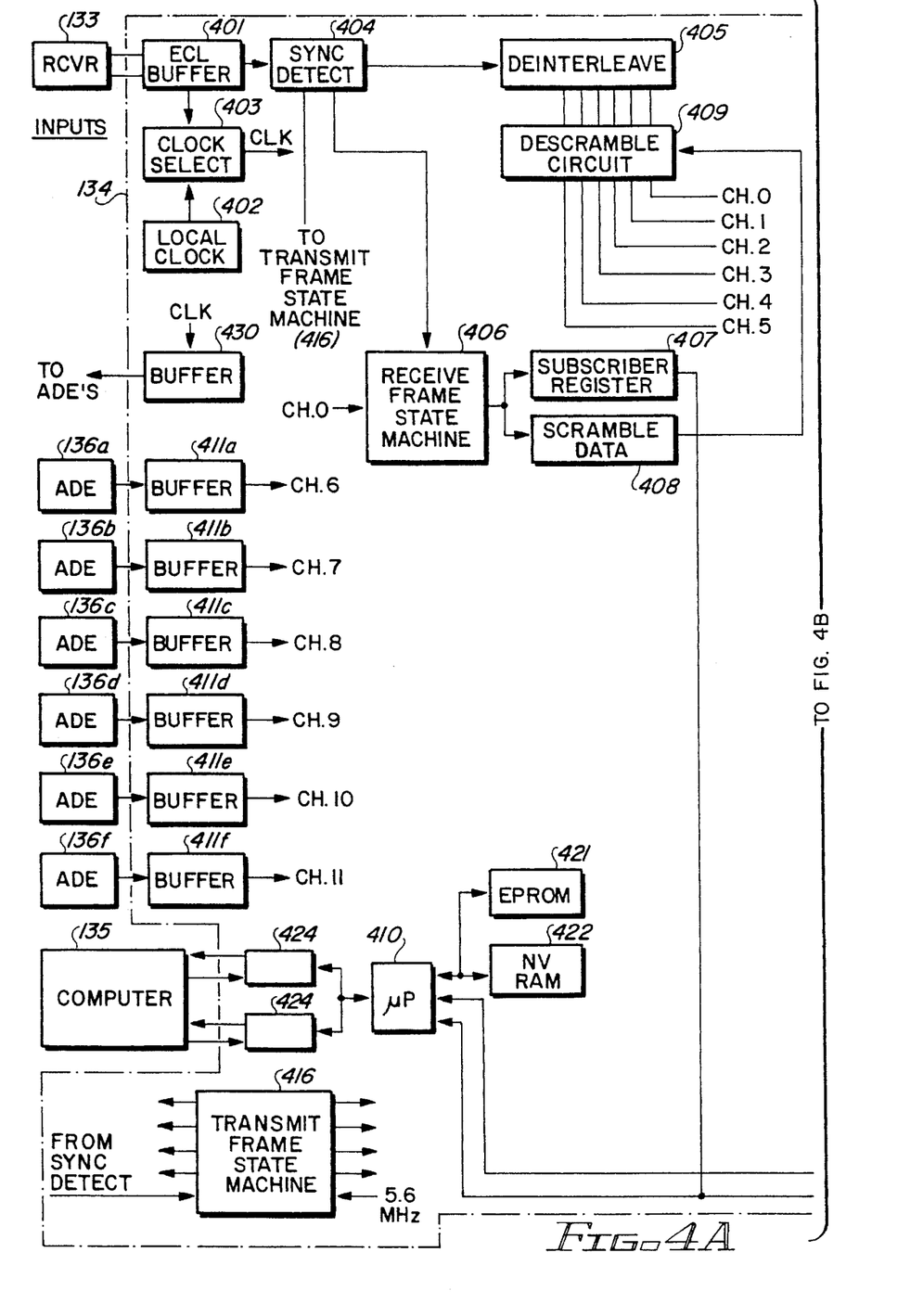
FIG. 4A and 4B (herein collectively referred to as FIG. 4) are block diagram of a headend processor in accordance with the present invention.
Figure 4B:
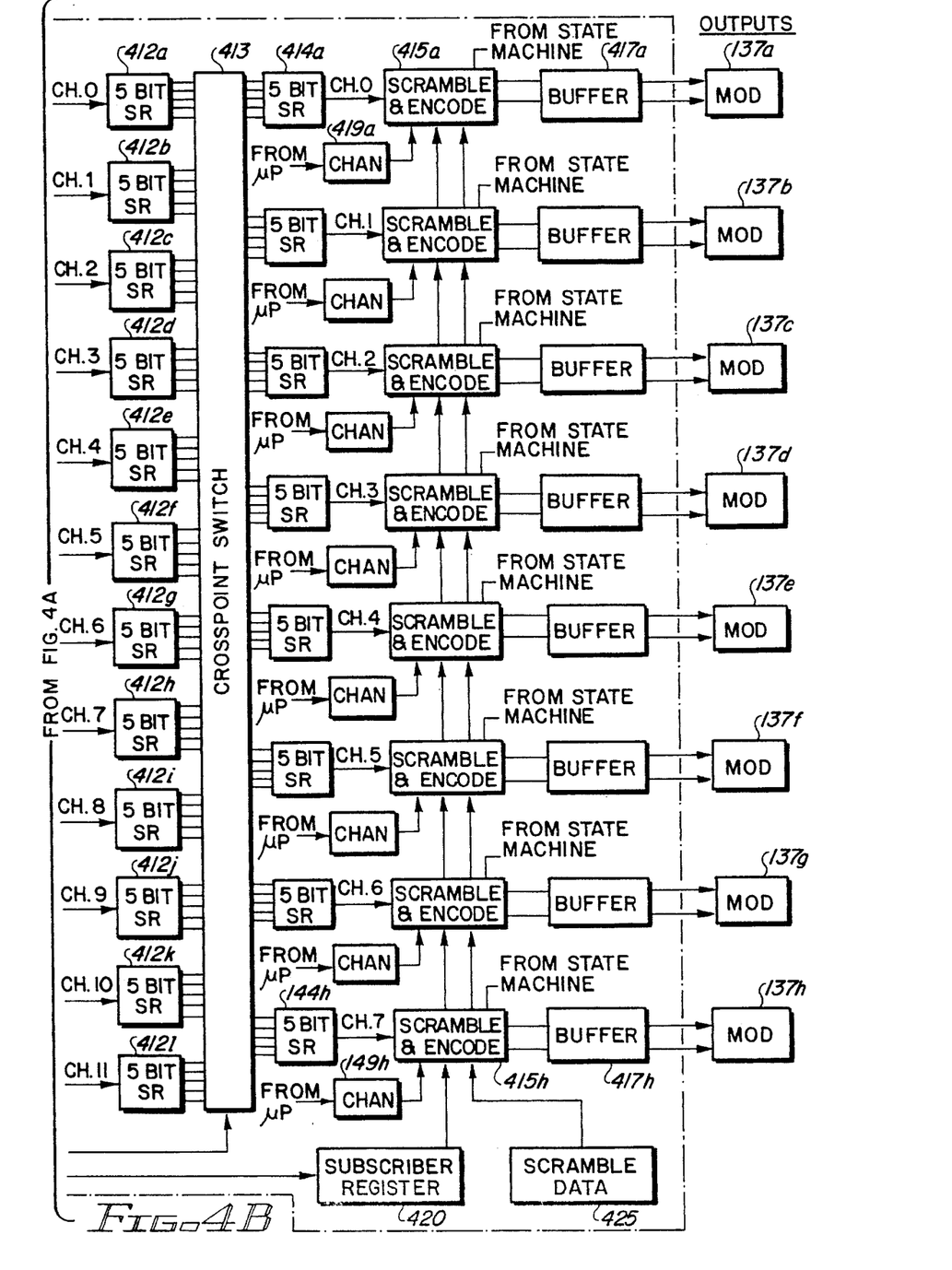

FIG. 4 is a block diagram of headend processor 134 in accordance with the present invention. The 33.8688 megabits per second data stream and a 33.8688 clock signal from receiver 133 are input to ECL buffer or interface level converter 401. Buffer 401 and a 33.8688 megahertz local clock 402 are coupled to a clock select circuit 403 which outputs an 11.2896 megahertz clock signal CLK derived from either the input data stream or the local clock 402. The clock signal CLK provides an overall timing signal. The data stream from buffer 401 is supplied to synchronization detector 404 for detecting the frame synchronization data in the data stream. The sync detect signal is also supplied to receive frame state machine 406 and to transmit frame state machine 416 as described in greater detail below. An audio digital encoder synchronization signal is supplied to framing state machine 305 of audio digital encoders 136a–136f from transmit frame state machine 416.

The data stream is deinterleaved by deinterleave circuit 405 to produce six channels CH0, CH1, CH2, CH2, CH3, CH4, CH5. Each of these channels is a 5.6448 megabits per second data stream and includes five stations. One of the channels, e.g., CH0, is supplied to receive framing state machine 406 which permits recovery of subscriber terminal control transactions and scrambling data provided from uplink location 101. The recovered subscriber transactions and the scrambling data are respectively stored in registers 407 and 408. The operation of receive framing state machine 406 and transmit framing state machine 416 will be discussed in greater detail below with reference to FIG. 5. The scrambling data in register 408 is utilized by descrambling circuit 409 to permit descrambling of the scrambled portions of the incoming data stream. Microprocessor 410 examines register 407 to recover subscriber control transactions.

The data streams from audio digital encoders 136a–136f are provided to respective interface level converters or buffers 411a–411f. Buffers 411a–411f may comprise, for example, EIA RS-422 level converters. The outputs of buffers 411a–411f constitute channels CH6, CH7, CH8, CH9, CH10, and CH11. The data streams of channels CH0-CH11 are supplied to serial-in parallel-out shift registers 412a–412f. In a present embodiment, shift registers 412a–412f are five bit shift registers which serve to demultiplex or deinterleave the five stations of each channel. Five bits from each of the channels CH0–CH11 are shifted in to registers 412a–412e. Accordingly, data from up to sixty input stations are available in parallel. The parallel data of these input stations may be routed to any of parallel-in serial-out shift registers 414a–414h in accordance with the settings of switch 413. Switch 413 is preferably a 64×64 crosspoint switch and permits data at any of its sixty-four input terminals to be directed to one or more of its sixty-four output terminals. Other switching mechanisms such as a time slot interchange switch may be utilized and the present invention is not limited in this respect. The output terminals of switch 413 are respectively coupled to shift registers 414a–414f. Thus, the parallel data of shift registers 412a–412f may be routed to any one or more of shift registers 414a–414f. Shift registers 414a–414f comprise five bit shift registers in the present embodiment. It is noted that in a present embodiment, twelve shift registers 412 and eight shift registers 414 are utilized, but the present invention is not limited in this respect. It will be seen that when the input data is routed to shift registers 414 and subsequently shifted out to scramble and encode circuits 415a–415h, the audio data is multiplexed or interleaved. Since registers 414 are five bit shift registers, a five to one (5:1) interleave is performed and thus each output channel CH0–CH7 includes audio program information from five stations. It will be apparent that since the settings of the crosspoint switch are determined locally, a system operator may configure output channels CH0–CH7 in any desired manner. The above-described inputs total sixty audio stations in a maximum configuration. From these, a minimum of five and a maximum of forty may be output in the present embodiment. These stations may be chosen in accordance with the wishes of a local system operator. That is, for each output channel that is used, any arbitrary combination of five input stations may be selected and placed in any order. Input stations may be appear in more than one output channel and may even be repeated within a single channel for, for example, system diagnostic purposes.

The desired configuration is determined via local system control computer 135. The configuration is provided to microprocessor 410 and is stored in non-volatile RAM 422. In the event of an interruption in power, microprocessor 410 retrieves the stored configuration and configures switch 413 in accordance with the stored configuration. EPROM 421 stores program information for use by the microprocessor.

The outputs of registers 414a–414h are provided to scramble and encode circuits 415a–415h. Scramble and encode circuits 415a–415h respectively, scramble and encode the serial data streams from registers 414 prior to transmission to subscriber location 103. The encoding utilizes the same frame format as that of the uplink location.

However, the headend processor of the present invention allows for local information to be inserted into several portions of the frame format shown in FIG. 2. Thus, the channel identification corresponding to the output channel, subscriber terminal control transactions, and scrambling data may be generated at headend location 102 and inserted at the appropriate times into the frame format. The channel identification data is provided to channel registers 419a–419h from microprocessor 410. The timing for such functions is provided by transmit frame state machine 416 and will be discussed in greater detail below.

As noted above, subscriber terminal control transactions transmitted from uplink location 101 are placed in register 407. In a first mode, headend processor 134 includes these control transactions on the output channels CH0–CH7. In the first mode, microprocessor 410 retrieves the subscriber transaction from register 407 and supplies the transaction to subscriber register 420. At the appropriate time in framing the output channels CH0–CH7, the contents of this register are retrieved by scramble and encode circuits 415a–415h to provide subscriber terminal control transactions for the output channels. In a second mode, subscriber terminal control transactions are generated by local system control computer 135 and are provided to microprocessor 410 via serial ports 424. In this mode, microprocessor 410 writes the subscriber terminal transaction provided by the computer 135 to subscriber register 420. Again, at the appropriate time in framing the output channels CH0–CH7, the contents of this register are retrieved by scramble and encode circuits 415a–415h to provide subscriber terminal control transactions for the output channels.

The specific format of the subscriber transactions and the number and type utilized may be varied and the present invention is not limited in this respect. It is only required that the subscriber terminal be able to recognize and act on the subscriber transactions and the present invention is not limited to specific implementations for achieving this result.

It is noted that the headend location itself includes an address and may be responsive to a limited number of transactions from uplink location 101. In this instance, microprocessor 410 examines the control transactions stored in register 407 to determine if, in fact, the transaction is addressed to the headend itself. If so, microprocessor 410 processes and acts on the instructions. These transactions are capable of controlling an overall enable/disable for all uplink stations provided to the headend processor as well as controlling individual stations which the headend processor is authorized to receive. Channel enable/disable transactions addressed to the headend processor itself have no effect on any channels that are originated from the local audio digital encoders.

Returning to FIG. 4, scrambling data may, for example, be generated by a psuedo-random binary sequence generator 425. Thus, the scrambling data used to scramble the output channels of the headend processor is different than the scrambling data used to scramble the data at the uplink location. A scrambling technique different than that used at the uplink location may also be implemented by the local system operator. This further enhances control by the local system operator.

The outputs of scramble and encode circuits 415a–415h are provided to buffer circuits 417a–417h. Buffers 417a–417h may, for example, be EIA RS–422 level converters. Buffer circuits 417a–417h are coupled to modulators 137a–137h of FIG. 1B.

Figure 5:
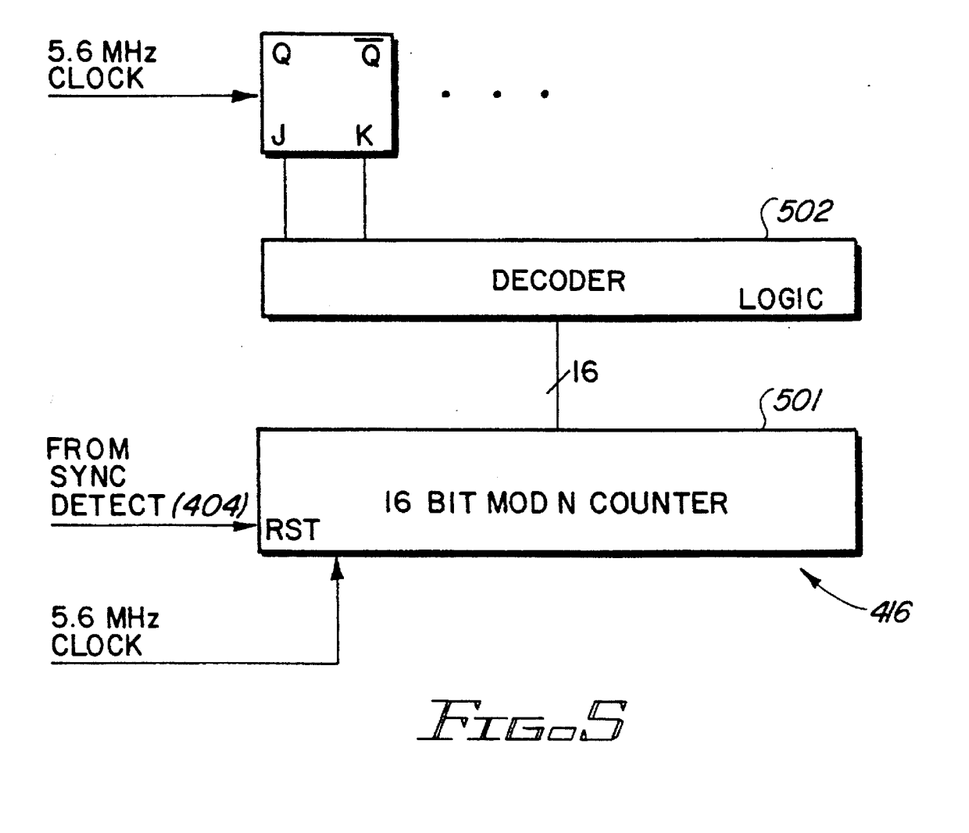
FIG. 5 is a block diagram of a transmit framing state machine illustrated in FIG. 4.

FIG. 5 illustrates transmit frame state machine 416 which may be utilized in headend processor 134 of the present invention. The state machine functions to keep track of the data stream in order to determine the location in a frame at a given instant of time. Toward this end, state machine includes a sixteen bit mod N counter 501, where as noted above N is the number of bits per frame. The reset input of counter 501 is coupled to sync detector 404 which resets the counter when a new frame is started so as to maintain synchronization between the data from uplink location 101 and the output channels of the headend processor if the satellite signal is present. If the satellite signal is not present, transmit frame state machine 416 is free-running. Counter 501 also receives a 5.6448 megahertz clock signal corresponding to the data rate of the output channels CH0–CH7. Counter 501 maintains a count corresponding to bit position within a frame, the count being incremented by the application of the 5.6448 megahertz clock signal. The count of the counter is provided to sixteen output lines and is used to drive a decoder 502 including an arrangement of logic gates. The count on counter 502 determines the inputs to the logic gates. Based on these inputs, decoder 502 outputs signals to J-K flip flops whose Q and/Q outputs are used to generate timing signals for the headend processor. For example, when the count of counter 501 represents the frame portion corresponding to channel identification data, a signal from state machine 416 to scramble and encode circuits 415a–415h causes the contents of channel registers 419a–419h to be incorporated into the output channels. Similarly, when the count represents the frame portion corresponding to scrambling data, state machine 416 causes scramble and encode circuits 415a–415h to examine the scrambling data generator 425 and incorporate the sequence obtained into the output channels. Receive frame state machine 406 and framing state machine 305 are similarly configured.

Thus, in accordance with headend processor 134, a first input receives first channels of digital program information from a remote uplink program source and a second input receives second channels of digital program information from a local program source. The first and second channels of digital information are applied to the crosspoint switch. In accordance with the settings of the crosspoint switch, an output channel arrangement may be determined by a local system operator. The system operator may utilize a local system control computer which interfaces with a microprocessor of the headend processor to configure the crosspoint switch to provide the desired output channel arrangement.

This capability provides flexibility to a system operator who is able to selectively configure the channels for distribution to a subscriber in a desired manner using a plurality of program sources. Specifically, the present invention provides the capability of combining programming from a remote program source with programming from a local programming source. Thus, the local system operator is not limited to provided only those audio programs provided from the remote uplink location, but is able to include audio programs of local interest. These local audio programs may be combined with or substituted for audio programs provided from the remote uplink location in any desired manner so that, for example, stations appealing to particular groups of subscribers may be included in the same channel.

The headend processor of the present invention receives channels of program and first control information from the remote uplink location and detects the first control information from the incoming data stream. The local system control computer at the headend processor location generates second control information. The first control information from the remote uplink location may be selectively replaced with the second control information from the local system control computer.

This arrangement provides significant control capabilities to local system operators who are provided with the capability of controlling local systems with a view toward enhanced customer service and an improved ability to troubleshoot problems associated with particular subscribers or groups of subscribers. Additionally, local system operators are able to control subscriber terminals in a manner consistent with features and functions present in existing systems.

The headend processor receives first and second program information from first and second program sources and first and second control information from first and second control sources. The first and second program information is applied to the crosspoint switch. In accordance with the configuration as determined by the local system operator, program information comprising combinations of the first and second program information are output to a subscriber. Processing circuitry allows for selectively providing the first and second control information to the channels output from the switching circuit. This arrangement provides maximum flexibility to a system operator who can configure the output channels and effect subscriber terminal control at the local level.

It is to be understood that the invention is not limited to the illustrations described and shown herein which are deemed to be merely illustrative. For example, the above teachings may be applied to video, text, other data and various combinations of video, audio, text, and other data. The invention rather is intended to encompass all such modifications which are within its spirit and scope as defined by the appended claims.

We claim:

1. A headend apparatus comprising:
   a first input for receiving plurality first digital time division multiplexed channels of program information from a first program source;
   a second input for receiving one or more second digital channels of program information from a second program source;
   a demultiplexing circuit coupled to said first input for demultiplexing the first channel of digital time division multiplexed program information into a plurality of demultiplexed digital channels of program information;
   a switching circuit to which the plurality of demultiplexed digital channels and the and second digital channels of programs information are applied; and
   a switch control for controlling said switching circuit to output third channels of program information comprising combinations of programs information of the first and second channels for distribution to subscriber.

2. The headend apparatus according to claim 1 wherein said first program source comprise a remote program source.

3. The headend apparatus according to claim 1 wherein:
   said switching circuit comprises a crosspoint switch.

4. The headend apparatus according to claim 1 wherein said second input receives second channels of interleaved digital program information.

5. The headend apparatus according to claim 4 wherein the demultiplexing circuit receives the time division multiplexed digital program information from the first channel and outputs demultiplexed program information to said switching circuit.

6. The headend apparatus according to claim 5 further comprising a circuit coupled to the to the output of said switching circuit for combining the program information from the switching circuit for distribution to a subscriber.

7. The headend apparatus according to claim 1 wherein said switch control comprises a microprocessor.

8. The headend apparatus according to claim 1 further comprising:
   a non-volatile memory coupled to said switch control for storing a configuration of said switching circuit as determined by said switch control.

9. The headend apparatus according to claim 1 wherein the program information of the first and second channels includes digital audio information.

10. A headend apparatus comprising:
    inputs for receiving first channel of time division multiplexed program information and second channel of program information from first and second program sources;
    inputs for receiving first and second control information from first and second control source;
    a demultiplexer circuit for demultiplexing the first channel of time division multiplexed program information into a plurality of demultiplexer channels of program information;
    a switching circuit to which said first demultiplexed channel and second channel of program information is applied;
    a switch control for controlling said switching circuit to output channels of program information comprising combinations of the first demultiplexed channel and second channel of program information for output to a subscriber; and
    means for selectively providing the received first and second control information to the channels output from said switching circuit.

11. The headend apparatus according to claim 10 wherein said switching circuit comprises a crosspoint switch.

12. The headend apparatus according to claim 10 wherein said inputs include an input receiving first program and first control information from a remote program and control source.

13. A method of generating an output channel containing program and control information for distribution to subscriber terminals comprising the steps of:
    receiving first and second program information from one or more program sources;
    generating control information at a first and second control source which contains instructions that indicates to the subscribers terminals to carry out a particular action;
    receiving the first and second control information from the first and second control sources;
    generating an output channel of program information comprising combinations of the first and second program information; and
    selectively providing either the first control information or the second control information to the output channel of program information.

14. A headed apparatus comprising:
    inputs for receiving first and second program information from one or more program sources;
    inputs for receiving first and second subscriber control information from first and second control sources;
    a switching circuit to which said first and second program information is applied;
    a switch control for controlling said switching circuit to output a channel of program information comprising combinations of the first and second programs information for output to a subscriber;

means for selectively providing either the first or the second subscriber control information to the output channel from said switching circuit; and a scrambler coupled to said switching circuit for scrambling the subscriber control information and program information output from said switching circuit to the subscriber.

15. A headend apparatus comprising:

program inputs for receiving first and second program information from a remote program source;

inputs for receiving first and second subscriber control information from first and second control sources, said subscriber control information containing instruction that indicates to subscribers terminal to carry out a particular action;

a switching circuit to which said first and second program information is applied;

a switch control for controlling said switching circuit to one ore more output channels of program information comprising combinations of the first and second program information for output to a subscriber;

means for selectively providing either the first or second subscriber control information to the channels output from said switching circuit; and a descrambler coupled to said program inputs for descrambling program information from said remote program source.

16. A headend apparatus comprising:

a first input for receiving one or more first digital channels of program information from a first program source;

a second input for receiving one or more second digital channels of program information from a second program source;

a switching circuit to which the first and second digital channels of program information are applied;

a switch control from controlling said switching circuit to output one or more third digital channels of program information comprising combinations of programs information of the first and second channels for distribution to a subscriber;

wherein said first input receives first interleaved channels of time division multiplexed digital program information; and a 1:6 deinterleave circuit for deinterleaving the first interleaved channels of digital program information and outputting six channels of digital program information, each channel comprising a 5.6448 megabits per second data stream.

17. The headend apparatus according to claim 16 wherein each channel comprises five stations of interleaved digital program information.

18. A headend apparatus comprising:

a first input for receiving one or more first digital channels of program information from a one or more program sources;

a second input for receiving one or more second digital channels of program information from said one or more program sources;

wherein said first input receives first interleaved channels of time division multiplexed digital program information and said second input receives second interleaved channels of time division multiplexed digital program information;

a demultiplexing circuit receiving the interleaved digital program information of the first and second channels from the first and second input and outputting demultiplexed program information;

a switching circuit to which the first and second demultiplexed digital channels of program information are applied;

a switch control for controlling said switching circuit to output one or more third digital channels of program information comprising combinations of program information of the first and second channels for distribution to a subscriber;

multiplexing circuit coupled to the output of said switching circuit for multiplexing the switched program information from said switching circuit to the third channels for distribution to the subscriber; and a scrambler coupled to the multiplexing circuit for scrambling the third channels.

19. A headend apparatus comprising:

a first input for receiving one or more first digital channels of program information from a first program source;

a second input for receiving one or more second digital channels of program information from a second program source;

a switching circuit to which the first and second digital channels of program information are applied;

a switch control for controlling said switching circuit to output one or more third digital channels of program information comprising combinations of programs information of the first and second channels for distribution to a subscriber;

wherein said first input receives first interleaved channels of time division multiplexed digital program information and said second input receives second interleaved channels of time division multiplexed digital program information;

demultiplexing circuits, comprising shift registers, receiving the interleaved digital program information of the first and second channels from the first and second input and outputting demultiplexed program information to said switching circuit; and multiplexing circuits coupled to the output of said switching circuit for multiplexing the program information from said switching circuit to the third channels for distribution to a subscriber.

20. A headend apparatus comprising:

a first input for receiving one or more first digital channels of program information from a first program source;

a second input for receiving one or more second digital channels of program information from a second program source;

wherein said first input receives first interleaved channels of time division multiplexed digital program information and said second input receives second interleaved channels of time division multiplexed digital program information;

demultiplexing circuits receiving the interleaved digital program information of the first and second channels received on the first and second input and outputting demultiplexed program information;

a switching circuit to which the first and second digital channels of demultiplexed program information are applied;

a switch control for controlling said switching circuit to output a plurality of digital channels of program information comprising combinations of programs information of the first and second channels;

multiplexing circuits, comprising shift registers, coupled to the output of said switching circuit for multiplexing the plurality of digital channels of program information from said switching circuit to one or more third channels for distribution to a subscriber.

21. A method of generating output channels for distribution to subscribers comprising the steps of:

receiving one or more first digital time division multiplexed channels of both program information and control information from a first source;

demultiplexing the one or more first channels of digital time multiplexed information into a plurality of demultiplexed digital channels of program information and demultiplexed channel of control information;

receiving a second channel containing control information from a second source;

generating a third channel of information comprising combinations of one or more demultiplexed digital channels of program information and the control information in the second channel;

replacing the control information in the demultiplexed channel with the control information in the second channel when generating the third channel; and distributing the third channel to plurality of subscribers.

22. A headend apparatus comprising:

a first input for receiving one or more first digital channel of time division multiplexed program information and control information from a first source;

a second input for receiving a second digital channel of control information from a second source;

a switching circuit to which information within the first digital channels and second digital channel are applied;

a switch control for controlling said switching circuit to output one or more third digital channels of information, each of said third channels comprising combinations program information of the first channels and control information from the second channels for distribution to a subscriber;

said switching circuit including means for replacing the control information in the first digital channels with the control information in the second digital channel when outputting the one or more third channels; and a scrambler coupled to an output of the switching circuit for scrambling the third channel.

23. The headend apparatus as recited in claim 22 wherein said first input receives first interleaved channels of time division multiplexed digital information comprising a 33.8688 megabits per second data stream.

\* \* \* \* \*